(12) United States Patent
Aposhian et al.

(10) Patent No.: US 11,160,219 B2
(45) Date of Patent: Nov. 2, 2021

(54) COUNTERBALANCED CUTTING HEAD FOR A SOD HARVESTER

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Mark C. LeBlanc, Salt Lake City, UT (US); Austin J. Neuner, Layton, UT (US); Seth W. Jeppson, Clearfield, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 416 days.

(21) Appl. No.: 16/435,195

(22) Filed: Jun. 7, 2019

(65) Prior Publication Data
US 2020/0383280 A1   Dec. 10, 2020

(51) Int. Cl.
*A01G 20/12* (2018.01)
*A01B 63/00* (2006.01)
*A01B 71/02* (2006.01)

(52) U.S. Cl.
CPC ............ *A01G 20/12* (2018.02); *A01B 63/002* (2013.01); *A01B 71/02* (2013.01)

(58) Field of Classification Search
CPC .... A01B 63/002; A01B 71/02; A01D 34/015; A01D 34/02; A01D 34/043; A01G 20/12
USPC .......................................................... 172/19
See application file for complete search history.

(56) References Cited

U.S. PATENT DOCUMENTS

| | | | | |
|---|---|---|---|---|
| 3,738,431 | A * | 6/1973 | Gennow | A01G 20/12 172/20 |
| 4,553,606 | A | 11/1985 | Arnold | |
| 4,632,192 | A | 12/1986 | Hooks | |
| 4,674,577 | A | 6/1987 | Meyer | |
| 8,978,779 | B2 * | 3/2015 | Aposhian | A01G 20/12 172/19 |
| 2006/0070747 | A1 | 4/2006 | Isaman et al. | |
| 2008/0236848 | A1 * | 10/2008 | Warke | A01G 20/12 172/19 |
| 2010/0193204 | A1 | 8/2010 | Warke | |
| 2011/0042111 | A1 | 2/2011 | Pugh | |
| 2013/0255978 | A1 | 10/2013 | Aposhian et al. | |

OTHER PUBLICATIONS

International Searching Authority, International Search Report and the Written Opinion, dated Aug. 20, 2020.

* cited by examiner

*Primary Examiner* — Gary S Hartmann
(74) *Attorney, Agent, or Firm* — Kirton McConkie; Brian Tucker

(57) ABSTRACT

A cutting head for a sod harvester is configured to counterbalance forces that are generated during operation. When the cutting head is operated, the cutting blade oscillates to sever sod from the ground. This oscillation of the cutting blade generates significant horizontal vibration forces that are transferred to the cutting head and other components of the sod harvester. The cutting head can include a crankshaft assembly with counterweights that are designed to balance these horizontal vibration forces. The cutting head can also include a countershaft assembly with counterweights that are also designed to balance these horizontal vibration forces while also balancing vertical vibration forces that the counterweights of the crankshaft assembly create.

20 Claims, 16 Drawing Sheets

COUNTERBALANCED CUTTING HEAD FOR A SOD HARVESTER

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1. Sod harvester 100 is in the form of a tractor and includes a cutting head 101 that cuts slabs of sod from the ground, inclined conveyor(s) 102 that elevate the slabs from the ground towards a stacking conveyor 103, a stacking head 105 that is mounted to a support mechanism 104, and a pallet dispenser 106 that is positioned adjacent a pallet support (not visible) on which stacking head 105 stacks slabs that it has removed from stacking conveyor 103.

Two general types of harvesters exist: slab harvesters; and roll harvesters. A roll harvester forms the slabs of sod into rolls which are then accumulated on the stacking conveyor for pick up. A slab harvester, on the other hand, directly stacks the slabs in their flat form. Sod harvester 100 represents a slab harvester.

BRIEF SUMMARY

The present invention extends to a counterbalanced cutting head for a sod harvester. When the cutting head is operated, the cutting blade oscillates to sever sod from the ground. This oscillation of the cutting blade generates significant horizontal vibration forces that are transferred to the cutting head and other components of the sod harvester. The cutting head can include a crankshaft assembly with counterweights that are designed to balance these horizontal vibration forces. The cutting head can also include a countershaft assembly with counterweights that are also designed to balance these horizontal vibration forces while also balancing vertical vibration forces that the counterweights of the crankshaft assembly create.

In some embodiments, the present invention is implemented as a cutting head for a sod harvester that includes: a cutting blade assembly having a cutting blade that is configured to oscillate between a frontward position and a rearward position; a crankshaft assembly having a crankshaft and one or more crankshaft counterweights that are configured to rotate around a crankshaft axis of rotation; and a countershaft assembly having a countershaft and one or more countershaft counterweights that are configured to rotate around a countershaft axis of rotation. When the cutting blade is in the rearward position, the one or more crankshaft counterweights and the one or more countershaft counterweights are configured to be positioned frontward of the crankshaft axis of rotation and countershaft axis of rotation respectively. Whereas, when the cutting blade is in the frontward position, the one or more crankshaft counterweights and the one or more countershaft counterweights are configured to be positioned rearward of the crankshaft axis of rotation and countershaft axis of rotation respectively. Furthermore, when the one or more crankshaft counterweights are positioned above the crankshaft axis of rotation, the one or more countershaft counterweights are configured to be positioned below the countershaft axis of rotation. Whereas, when the one or more crankshaft counterweights are positioned below the crankshaft axis of rotation, the one or more countershaft counterweights are configured to be positioned above the countershaft axis of rotation.

In other embodiments, the present invention is implemented as a sod harvester having a cutting head that includes: a cutting blade assembly having a cutting blade that is configured to oscillate to sever sod from the ground as the sod harvester travels over the ground; a crankshaft assembly having one or more crankshaft counterweights that are configured to rotate to balance horizontal forces created by the oscillation of the cutting blade; and a countershaft assembly having one or more countershaft counterweights that are configured to rotate to balance vertical forces created by the rotation of the one or more crankshaft counterweights.

In other embodiments, the present invention is implemented as a cutting head for a sod harvester that includes: a cutting blade assembly having a cutting blade; and a crankshaft assembly having a crankshaft and one or more crankshaft counterweights that are configured to rotate around a crankshaft axis of rotation. The crankshaft assembly is coupled to the cutting blade assembly and is configured to cause the cutting blade to oscillate. The rotation of the one or more crankshaft counterweights balances horizontal forces created by the oscillation of the cutting blade. The cutting head also includes a countershaft assembly having one or more countershaft counterweights that are configured to rotate to balance the horizontal forces created by the oscillation of the cutting blade and to balance vertical forces created by the rotation of the one or more crankshaft counterweights.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle. The term "cutting head" should be construed as the portion of a sod harvester that cuts sod from the ground. Cutting heads configured in accordance with embodiments of the present invention could be employed on slab harvesters, roll harvesters or any other harvesters that cut sod from the ground.

Figure 1:
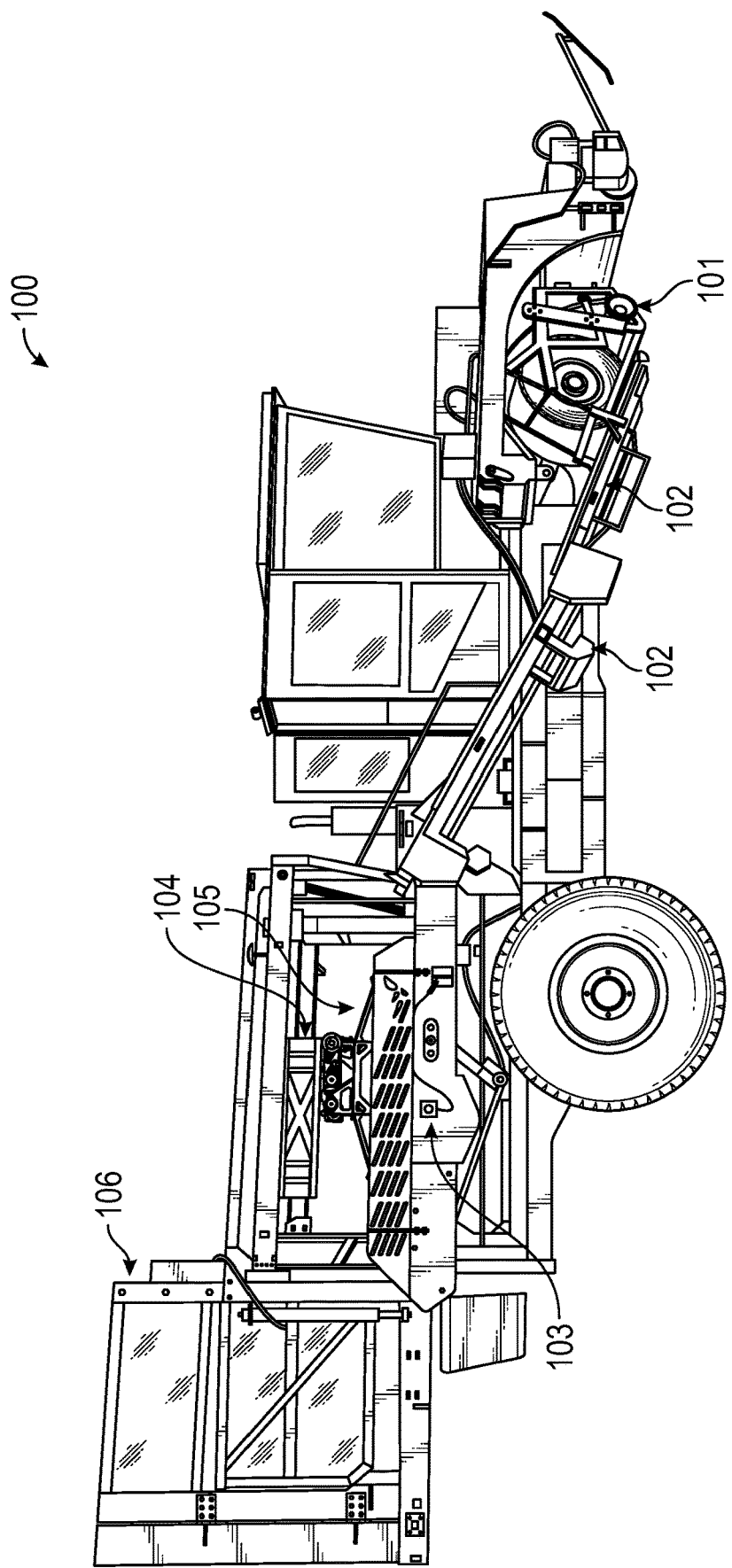
FIG. 1 illustrates a prior art sod harvester.
Figure 2A:
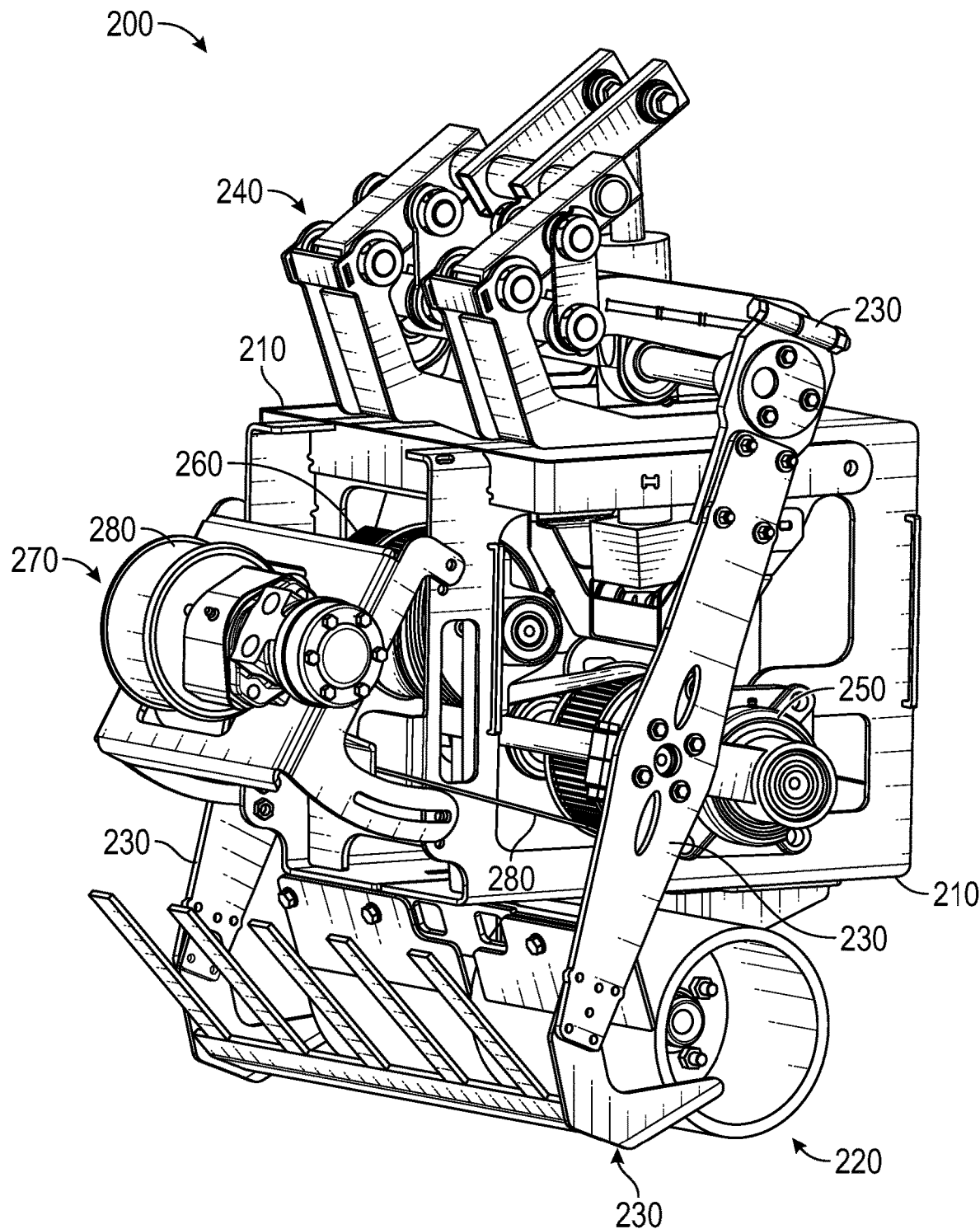
FIG. 2A provides a rear perspective view of a cutting head that is configured in accordance with embodiments of the present invention.
Figure 2B:
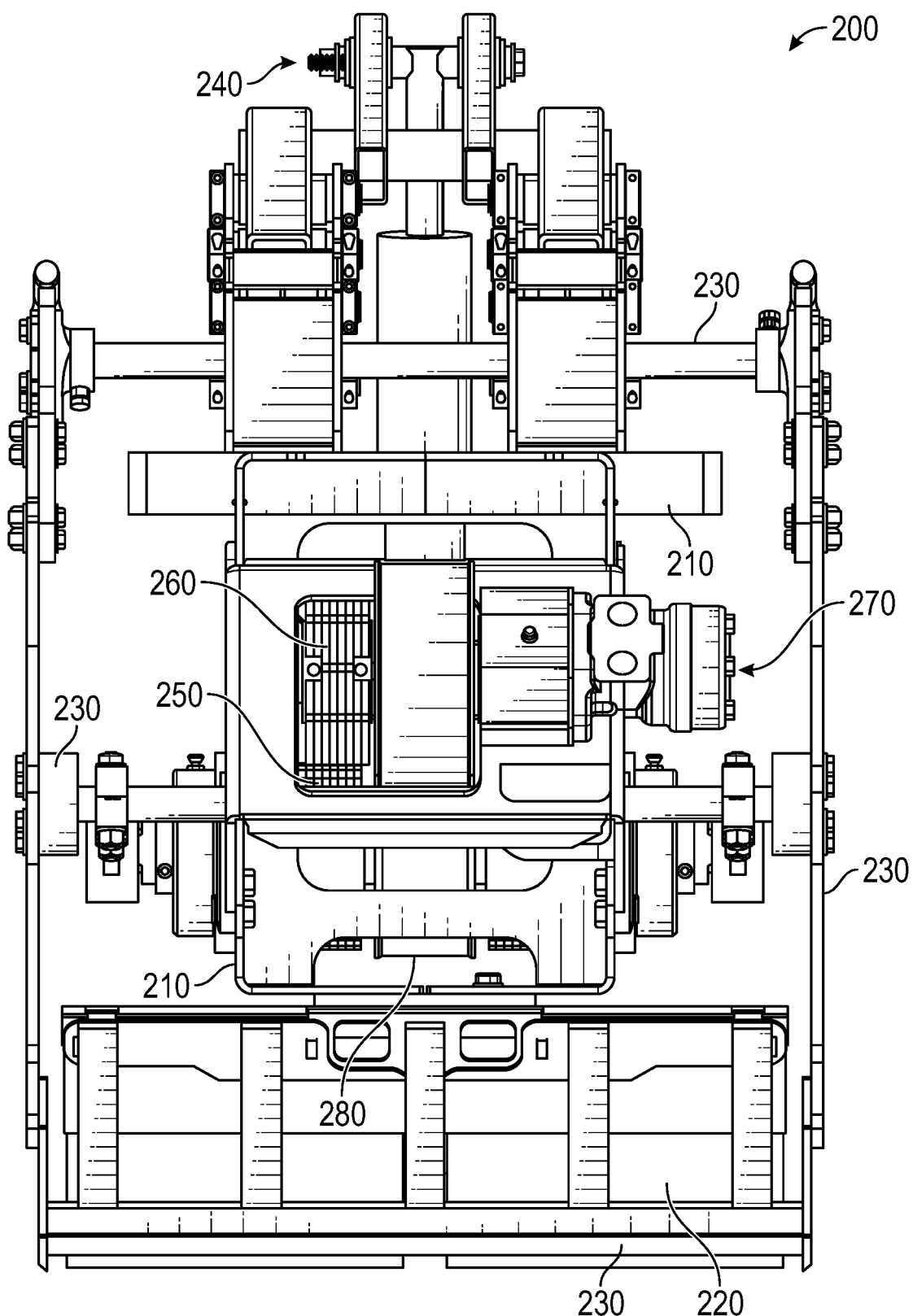
FIG. 2B provides a rear view of the cutting head.

FIGS. 2A and 2B provide a rear perspective view and a rear view respectively of a cutting head 200 that is configured in accordance with embodiments of the present invention. In this context, the front and rear of cutting head 200 correspond with the front and rear respectively of the sod harvester on which the cutting head is employed. FIG. 2B therefore represents a view from behind cutting head 200 while it is used to cut sod from the ground. With reference to FIG. 1, cutting head 200 could be used in place of cutting head 101.

Cutting head 200 includes a cutting head frame 210, a ground roller assembly 220, a cutting blade assembly 230, a depth control assembly 240, a crankshaft assembly 250, a countershaft assembly 260, a motor assembly 270 and a driving loop 280. It is noted, however, that a cutting head configured in accordance with embodiments of the present invention need not include each of these assemblies. For better illustration, FIGS. 3A-3H provide a number of isolated views of these various assemblies.

Figure 3A:
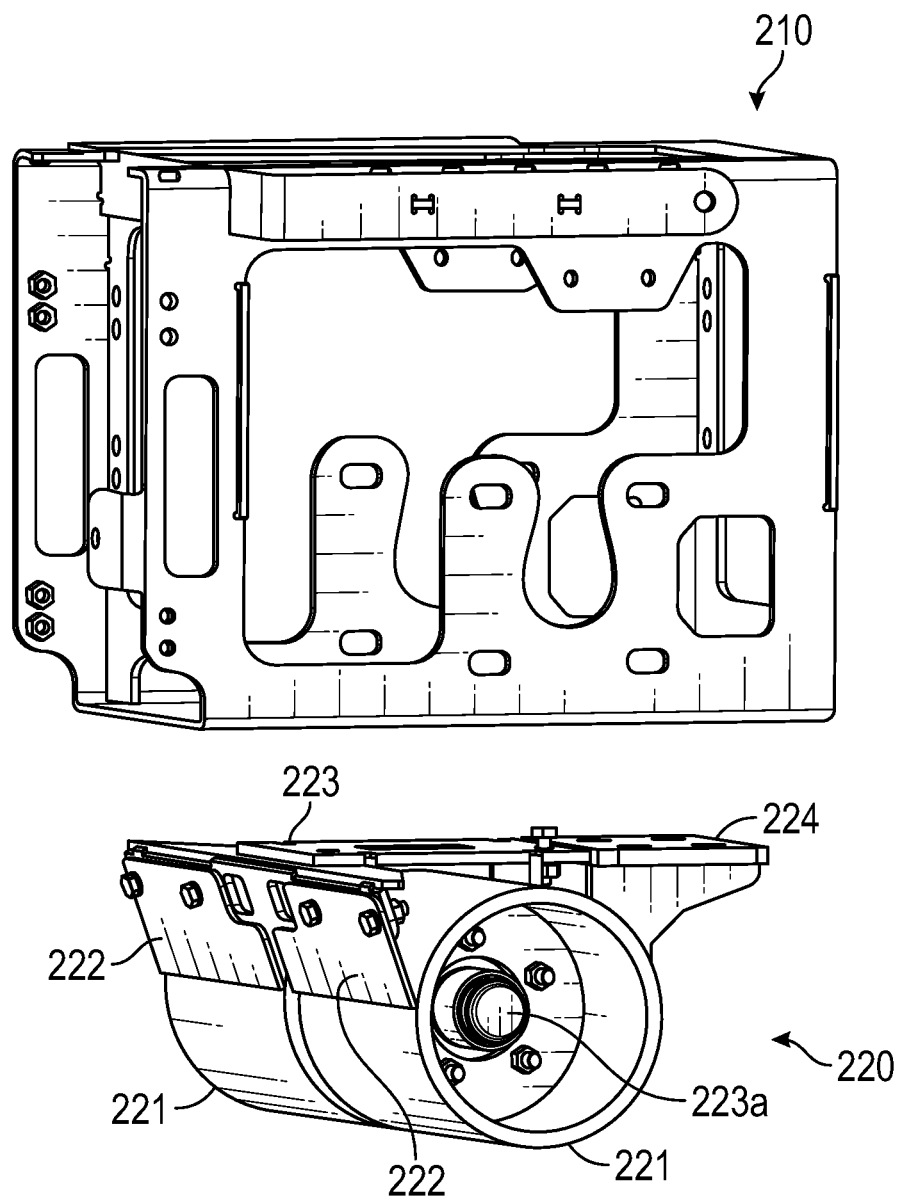
FIG. 3A provides an isolated, rear perspective view of a cutting head frame and a ground roller assembly of the cutting head.

FIG. 3A provides an isolated view of cutting head frame 210 and ground roller assembly 220 when detached from cutting head frame 210. Cutting head frame 210 can be configured to enable cutting head 200 to be coupled to a sod harvester and to house and/or support the various assemblies. For example, cutting head frame 210 could be coupled to a boom of a sod harvester using the techniques described in U.S. Pat. No. 8,978,779 (the "'779 Patent") which is incorporated herein by reference. However, cutting head frame 210 could equally be configured to enable cutting head 200 to be coupled to a sod harvester in any other suitable way.

Ground roller assembly 220 includes one or more ground rollers 221, one or more ground roller scrapers 222, and a bracket 223 that forms opposing axles 223a. Bracket 223 can be configured to mount to the bottom of cutting head frame 210 to thereby secure ground roller assembly 220 to the cutting head frame. In the depicted embodiment, two rollers 221 are positioned on and rotate around respective axles 223a. Each roller 221 can be secured via a hub (not visible). Ground roller scrapers 222 extend downwardly from bracket 223 and are positioned against rollers 221 to thereby scrape dirt, mud or other debris from the rollers. Mount 224 is positioned in front of rollers 221 and functions as a connection point by which cutting head frame 210 can be coupled to the boom or other portion of a sod harvester. In some embodiments, mount 224 can function as the connection point for the lower yoke described in the '779 Patent.

Figure 3B:
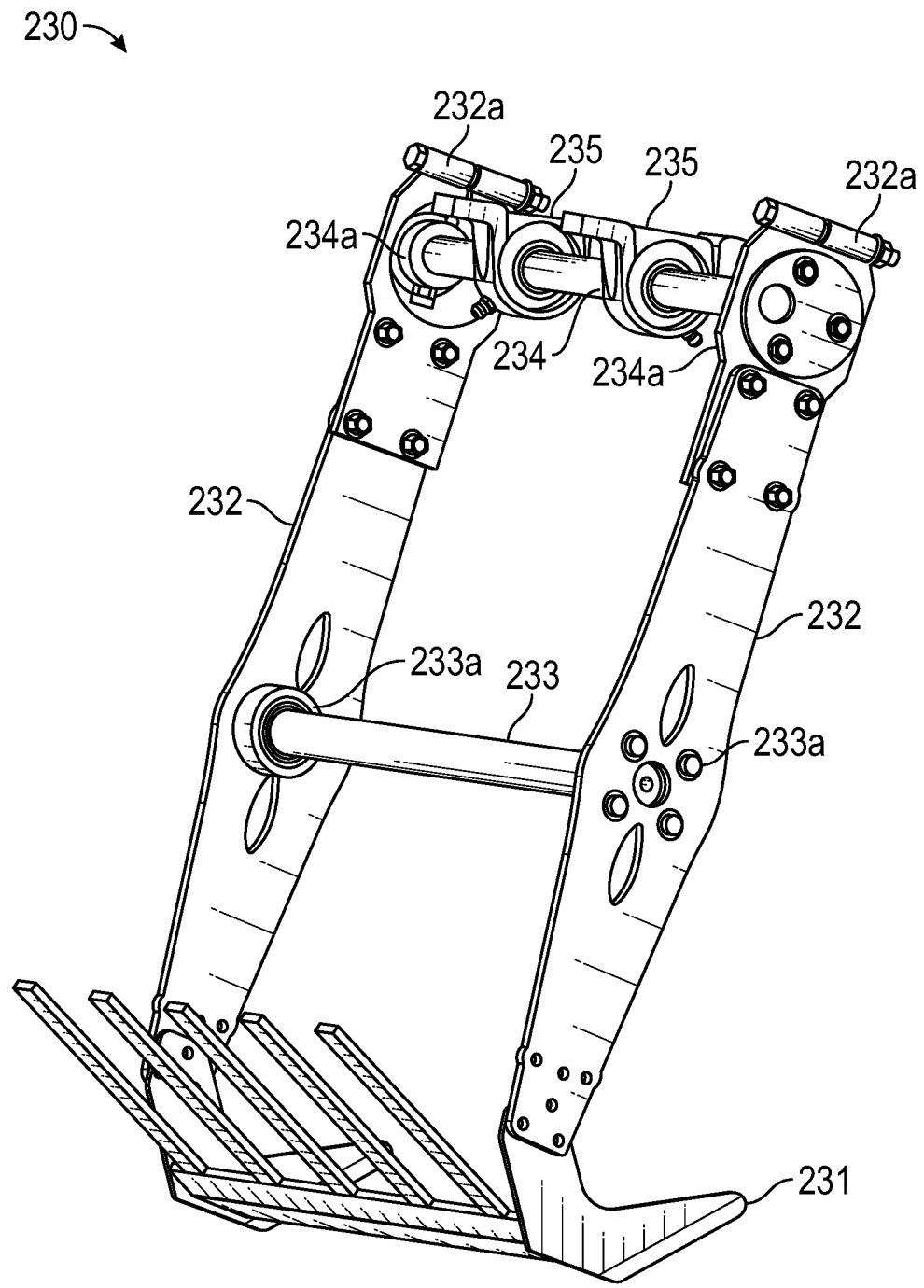
FIG. 3B provides an isolated, rear perspective view of a cutting blade assembly of the cutting head.

FIG. 3B provides an isolated view of cutting blade assembly 230. Cutting blade assembly 230 includes a cutting blade 231 that is positioned at the bottom of cutting blade assembly 230 and functions to sever sod from the ground. In particular, as the sod harvester travels forwardly, cutting blade 231 passes under the turf at a desired depth to sever the sod and lift it towards the inclined conveyor(s). Cutting blade 231 is supported from the bottom end of opposing cutting blade arms 232. With reference to FIG. 2A, cutting blade arms 232 are positioned outside of and extend downwardly and slightly rearwardly alongside cutting head frame 210.

The top end of each cutting blade arm 232 includes a coupling plate 232a. Each coupling plate 232a houses an upper shaft cam 234a which supports a corresponding end of an upper shaft 234. Upper shaft 234 extends through bearings 235 (which may be pillow block bearings) which are coupled to depth control assembly 240 as described in more detail below. Each cutting blade arm 232 also includes a bearing 233a which supports a corresponding end of a center shaft 233. As described in detail below, center shaft 233 and upper shaft 234 function to enable cutting blade 231 to be oscillated at a high rate along a plane that is substantially parallel to the ground.

Figure 3C:
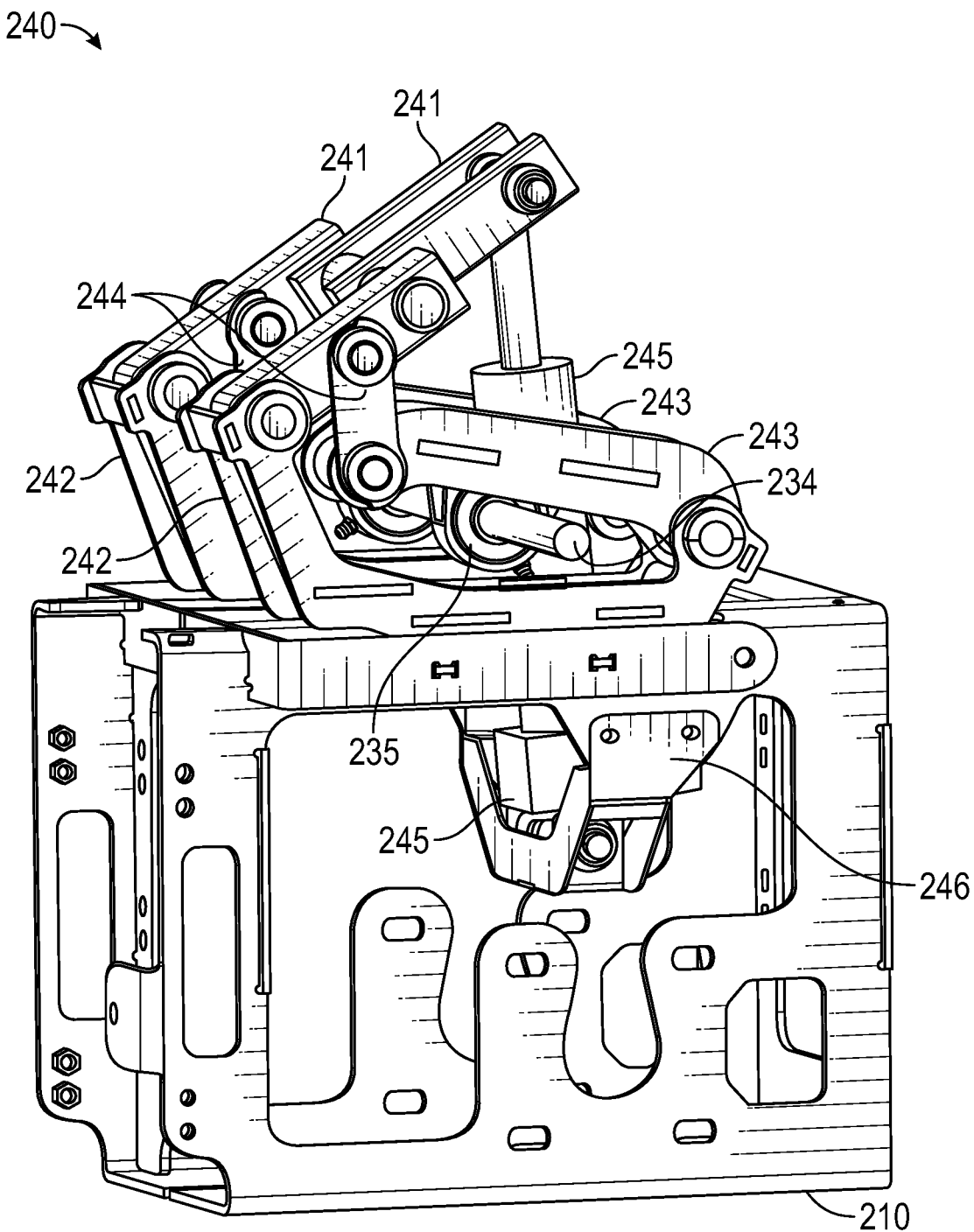
FIG. 3C provides an isolated, rear perspective view of the cutting head frame and a depth control assembly of the cutting head.

FIG. 3C provides an isolated view of cutting head frame 210 and depth control assembly 240. Depth control assembly 240 includes opposing links 242 that are mounted to the top of cutting head frame 210. A yoke 241 is coupled to the rear ends of links 242 and extends frontwardly, while opposing bearing bars 243 are coupled to the front ends of links 242 and extend rearwardly. Rear ends of bearing bars 243 are coupled to yoke 241 via links 244. Accordingly, when yoke 241 is pivoted upwardly, bearing bars 243 will be lifted relative to cutting head frame 210. Similarly, when yoke 241 is pivoted downwardly, bearing bars 243 will be lowered relative to cutting head frame 210.

Bearings 235 are coupled to bearing bars 243 such that upper shaft 234, and therefore, cutting blade assembly 230, will be raised and lowered as yoke 241 is raised and lowered. An actuator 245 is coupled between a front end of yoke 241 and a hanger 246 that is secured within cutting head frame 210. Actuator 245 can therefore be extended and retracted to raise and lower the position of cutting blade assembly 230 relative to cutting head frame 210. In this way, depth control assembly 240 can be used to control the depth of cutting blade 231.

Figure 3D:
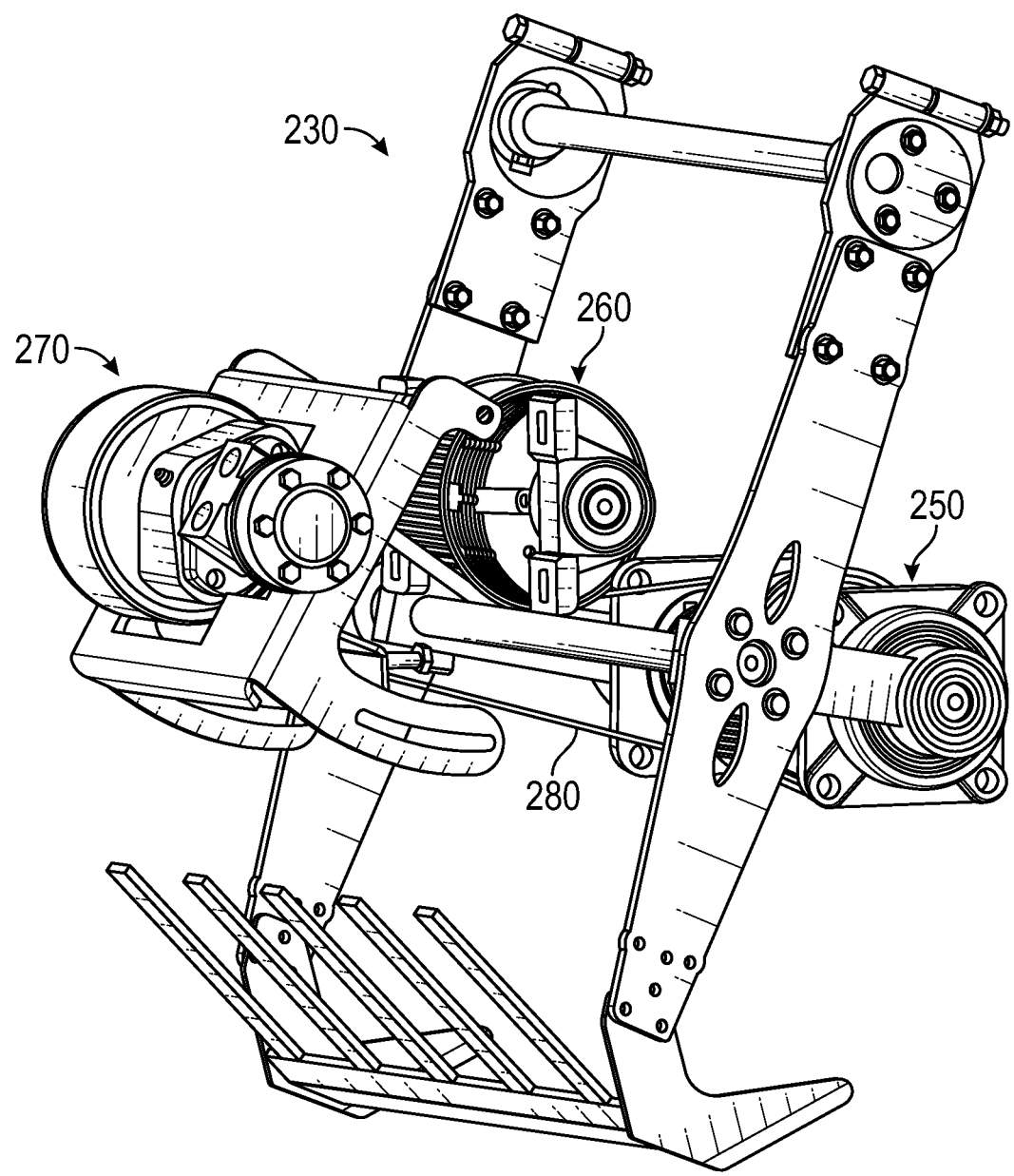
FIG. 3D provides an isolated, rear perspective view of the cutting blade assembly, a crankshaft assembly, a countershaft assembly and a motor assembly of the cutting head.
Figure 3E:
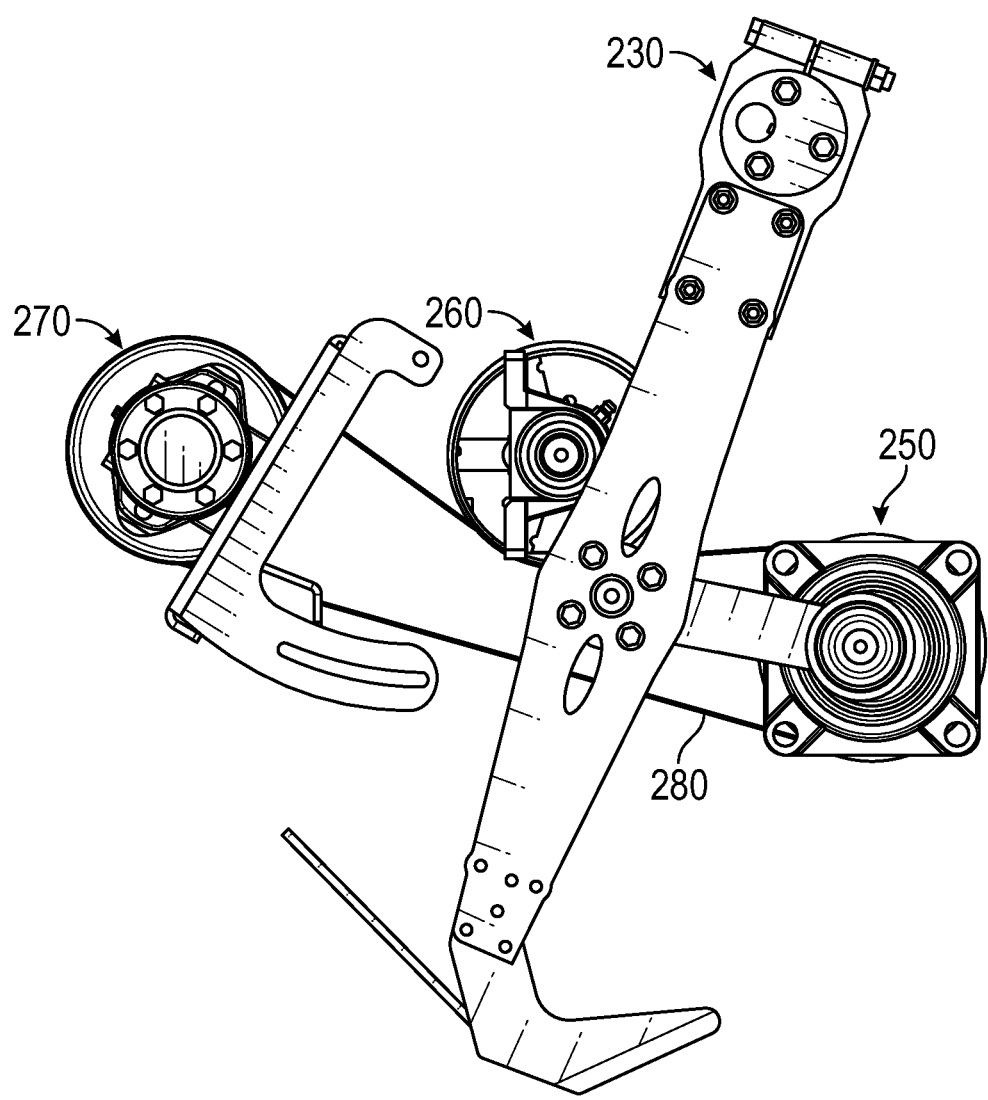
FIG. 3E provides an isolated, side view of the cutting blade assembly, the crankshaft assembly, the countershaft assembly and the motor assembly of the cutting head.

FIGS. 3D and 3E provide a rear perspective view and a side view respectively of cutting arm assembly 230, crankshaft assembly 250, countershaft assembly 260 and motor assembly 270 in isolation. Motor assembly 270 functions to rotate driving loop 280. Driving loop 280 is routed around crankshaft assembly 250 and countershaft assembly 260 in a manner that causes the two assemblies to rotate in opposite directions.

Figure 3F:
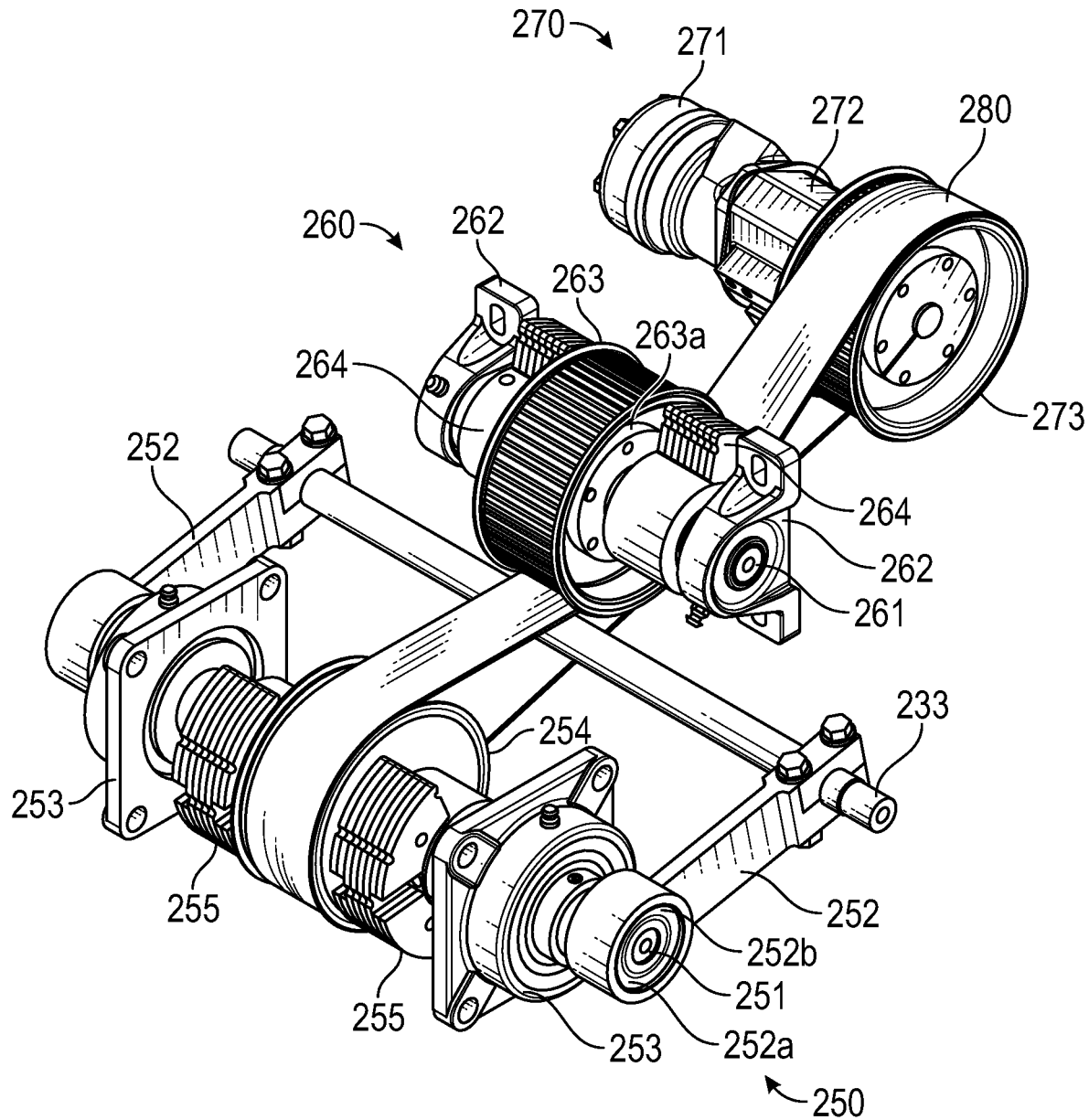
FIG. 3F provides an isolated, front perspective view of the crankshaft assembly, the countershaft assembly and the motor assembly of the cutting head.
Figure 3G:
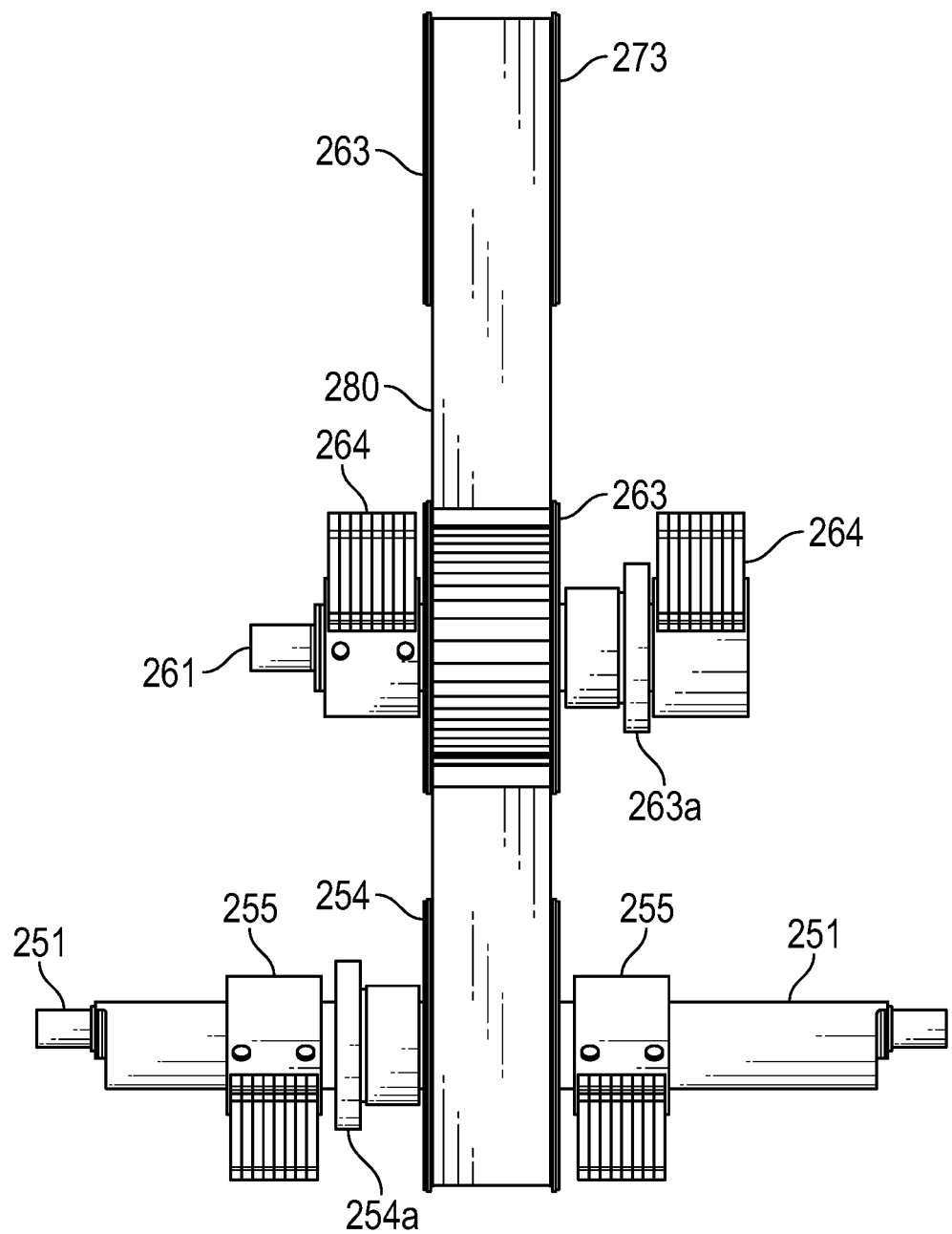
FIG. 3G provides an exploded front view of some of the components of the crankshaft assembly, the countershaft assembly and the motor assembly of the cutting head.

FIG. 3F provides a front perspective view of crankshaft assembly 250, countershaft assembly 260 and motor assembly 270 in isolation. FIG. 3G provides an exploded rear view of a subset of the components of crankshaft assembly 250, countershaft assembly 260 and motor assembly 270 that are shown in FIG. 3G. As shown, crankshaft assembly 250 includes a crankshaft 251 that extends substantially parallel to center shaft 233 and that is secured to cutting head frame 210 via opposing bearings 253. Bearings 253 allow crankshaft 251 to rotate independently of cutting head frame 210. Opposing connecting rods 252 extend between the respective ends of crankshaft 251 and center shaft 233. Each connecting rod 252 is coupled to crankshaft 251 via a bearing 252a and a retaining ring 252b. As described in greater detail below, rotation of crankshaft 251 will cause center shaft 233, and therefore cutting blade 231, to be oscillated.

Crankshaft assembly 250 also includes a wheel 254 and counterweights 255 that are positioned on opposing sides of wheel 254. Crankshaft 251 extends through and is fixed to wheel 254 via bushing 254a. Crankshaft 251 also extends through and is fixed to counterweights 255. Driving loop 280 extends around wheel 254 to thereby drive crankshaft 251. As crankshaft 251 is rotated, counterweights 255 will likewise rotate.

Countershaft assembly 260 includes a countershaft 261 that also extends substantially parallel to center shaft 233 and that is secured to cutting head frame 210 via bearings 262 (which may be pillow block bearings). Bearings 262 allow countershaft 261 to rotate independently of cutting head frame 210. Like crankshaft assembly 250, countershaft assembly 260 includes a wheel 263 and counterweights 264 on opposing sides of wheel 263. Countershaft 261 extends through and is fixed to wheel 263 via bushing 263a. Countershaft 261 also extends through and is fixed to counterweights 264. Driving loop 280 extends at partially around wheel 263 to thereby drive countershaft 261. As countershaft 261 is rotated, counterweights 264 will likewise rotate.

Motor assembly 270 includes a motor 271 that is coupled to a wheel 273 via a load adapter 271. Driving loop 280 extends around wheel 273. In some embodiments, wheels 254, 263 and 273 may be in the form of sprockets and therefore, driving loop 280 may be in the form of a chain or a toothed/timing belt. In other embodiments, wheels 254, 263 and 273 may be in the form of pulleys and therefore, driving loop 280 may be in the form of a belt. Regardless of its type, driving loop 280 can cause the rotation of crankshaft 251 to be synchronized with the rotation of countershaft 261. In other words, crankshaft 251 and countershaft 261 can be rotated at the same velocity but in opposite directions to ensure that counterweights 255 and 264 maintain the relative positions described in FIGS. 4A-4E below.

Crankshaft assembly 250 and countershaft assembly 260 may also be driven in different ways from what is shown in the figures. For example, a separate motor assembly could be employed to drive countershaft assembly 260. In such cases, the separate motor assembly could be electronically geared to motor assembly 270 to ensure that the rotation of crankshaft 251 is synchronized with the rotation of countershaft 261. In short, many different techniques/configurations can be employed to drive crankshaft assembly 250 and countershaft assembly 260 as long as the rotation of crankshaft 251 is synchronized with the rotation of countershaft 261.

As best seen in FIG. 3E, countershaft assembly 260 is positioned between motor assembly 270 and crankshaft assembly 250. A bottom edge of wheel 263 is positioned below a plane that extends between the top edges of wheels 254 and 273. With this arrangement of wheels 254, 263 and 273, driving belt 280 can wrap around wheels 254 and 273 but underneath wheel 263 thereby causing wheels 254 and 263 to be rotated in different directions. Alternatively, countershaft assembly 260 could be positioned below a plane that extends between the bottom edges of wheels 254 and 273. In this arrangement, driving belt 280 can wrap around wheels 254 and 273 but overtop wheel 263 to again cause wheels 254 and 263 to be rotated in different directions.

In other embodiments, countershaft assembly 260 could be located in any other position relative to crankshaft assembly 250, and additional wheels could be employed to ensure that driving loop 280 causes wheels 254 and 263 to rotate in opposite directions. As one example only, countershaft assembly 260 could be positioned directly above crankshaft assembly 250. In this arrangement, driving loop 280 could pass under wheel 263, around another wheel that is positioned frontwardly from wheel 263 and then around wheel 254.

Figure 3H:
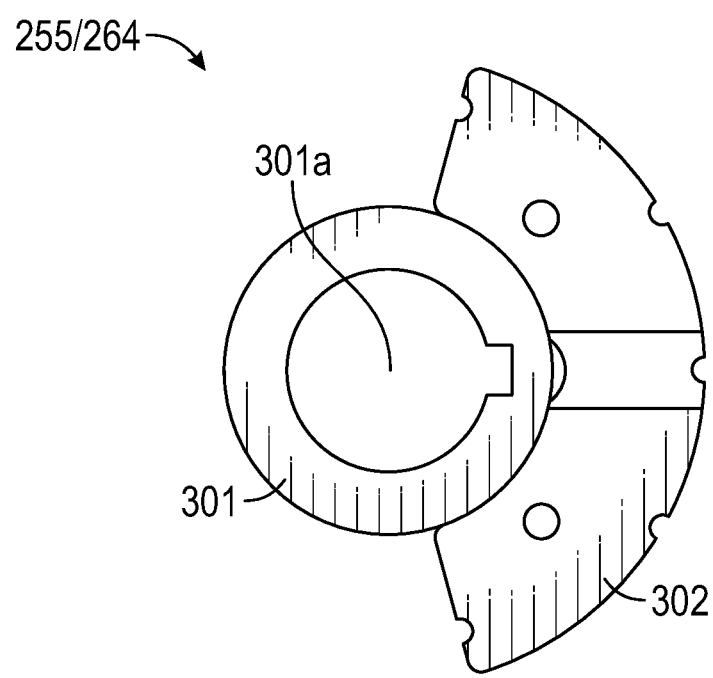
FIG. 3H provides an isolated, side view of a counterweight that can be employed in the crankshaft assembly and the countershaft assembly.

FIG. 3H provides an isolated view of a counterweight 255/264. Each counterweight 255/264 may include a central portion 301 that defines an axis of rotation 301a and an offset portion 302. Offset portion 302 represents the portion of the counterweight that causes the counterweight's center of mass to be offset from the axis of rotation. In the depicted embodiment, offset portion 302 resembles a semi-circle. However, offset portion 302 could have any other suitable shape and/or configuration. With reference to the orientation of counterweight 255/264 shown in FIG. 3H, offset portion 302 will cause the center of mass to be positioned to the right of the axis of rotation.

In the depicted embodiments, wheels 254, 263 and 273 are centered and aligned within cutting head frame 210, while a pair of counterweights 255 are arranged on opposing sides of wheel 254 and a pair of counterweights 264 are arranged on opposing sides of wheel 263. This arrangement balances the forces that counterweights 255 and 264 create. However, in other embodiments, a single counterweight 255 and a single counterweight 264 could be employed in crankshaft assembly 250 and countershaft assembly 260 respectively.

Figure 4A:
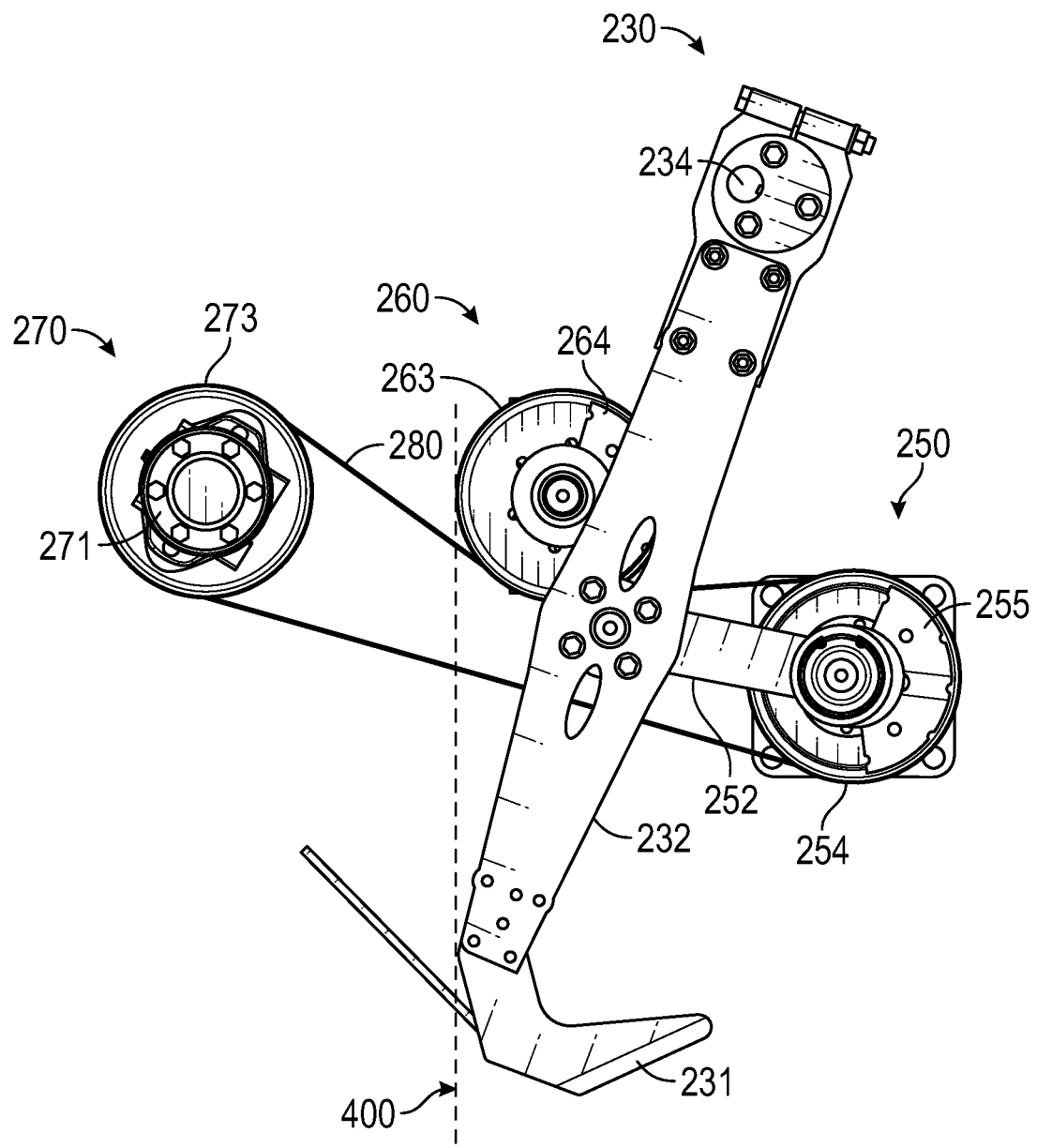
FIGS. 4A-4E illustrate how the crankshaft assembly and the countershaft assembly can be configured to counterbalance the cutting blade assembly.
Figure 4B:
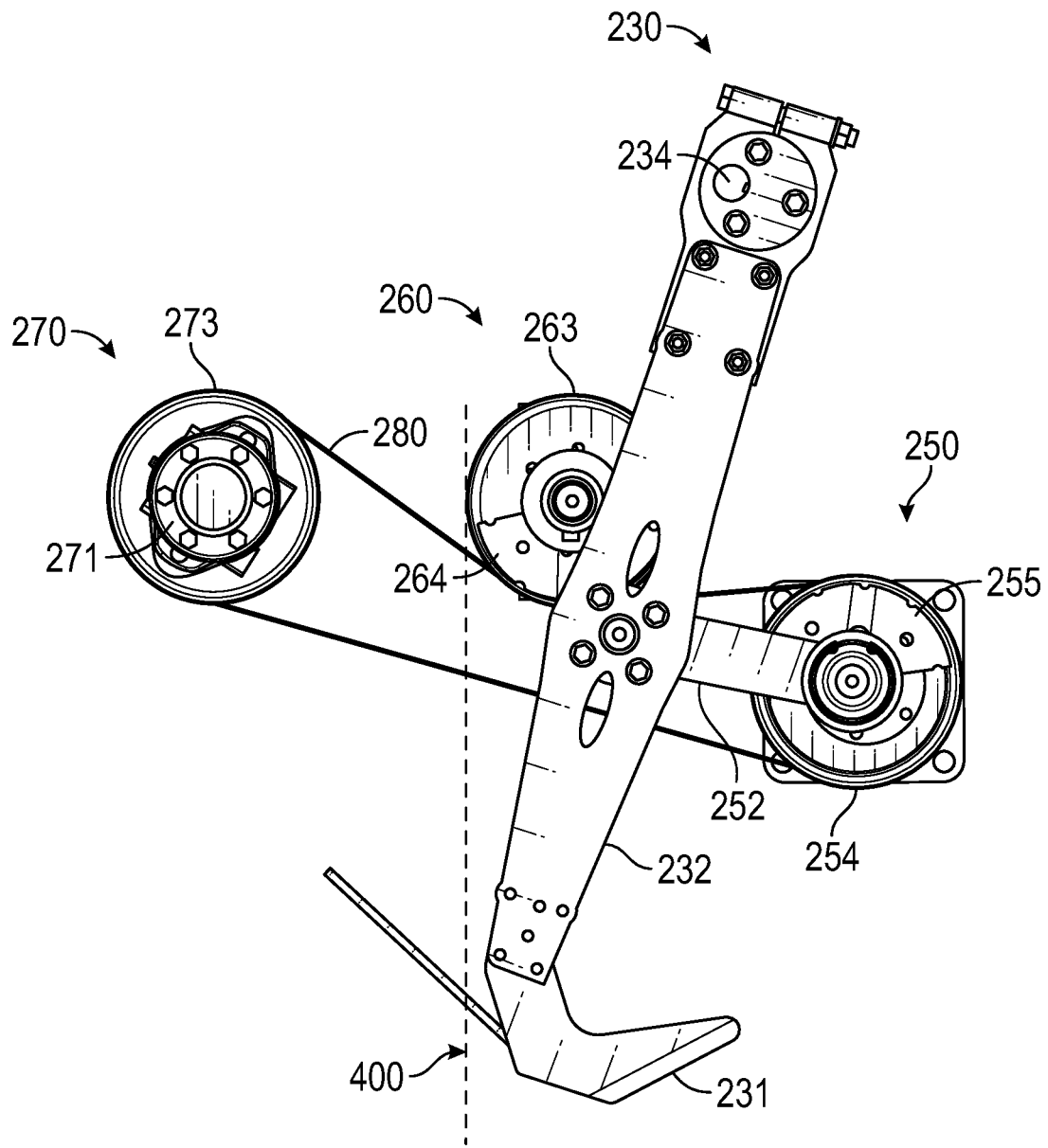
Figure 4C:
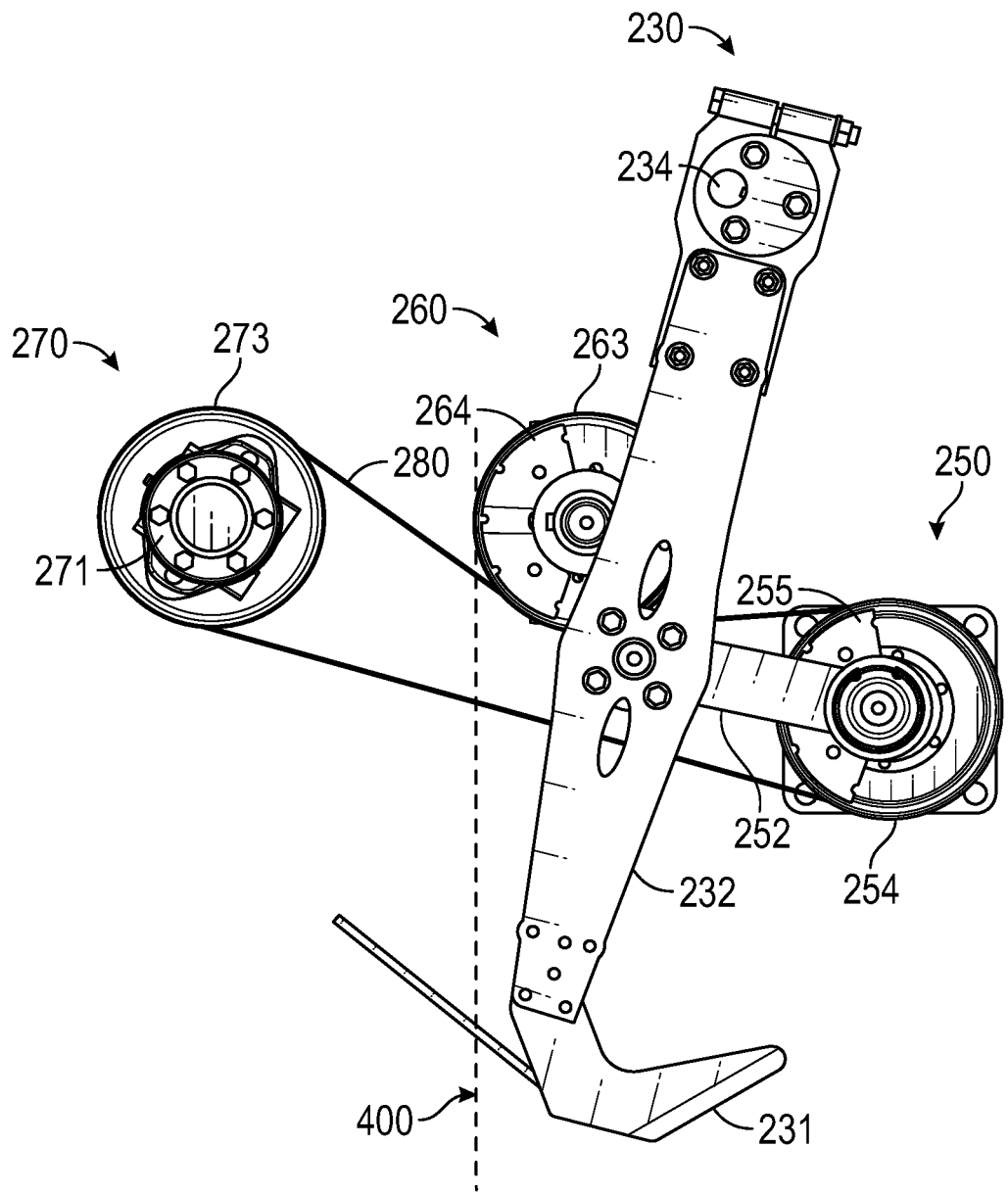
Figure 4D:
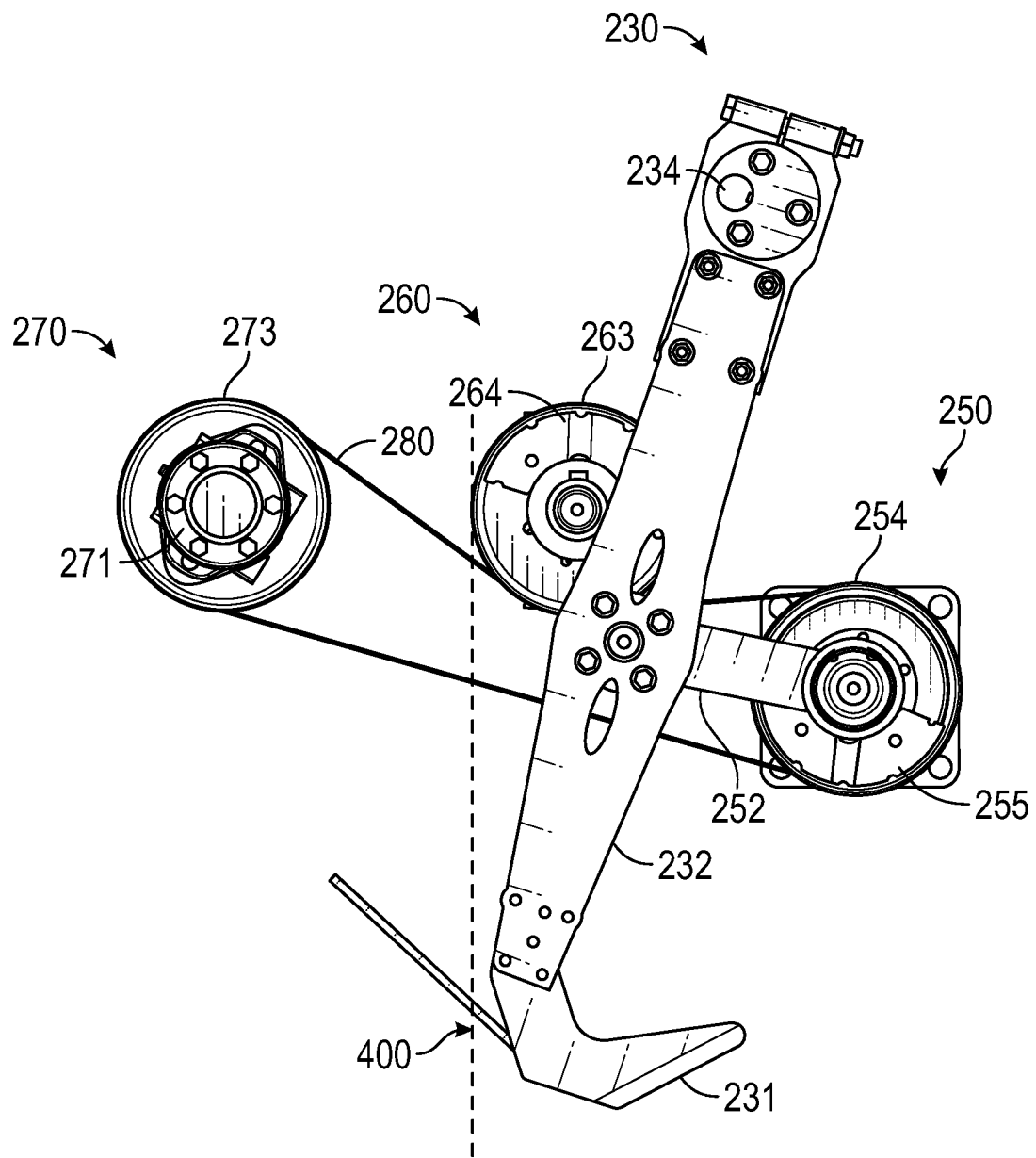
Figure 4E:
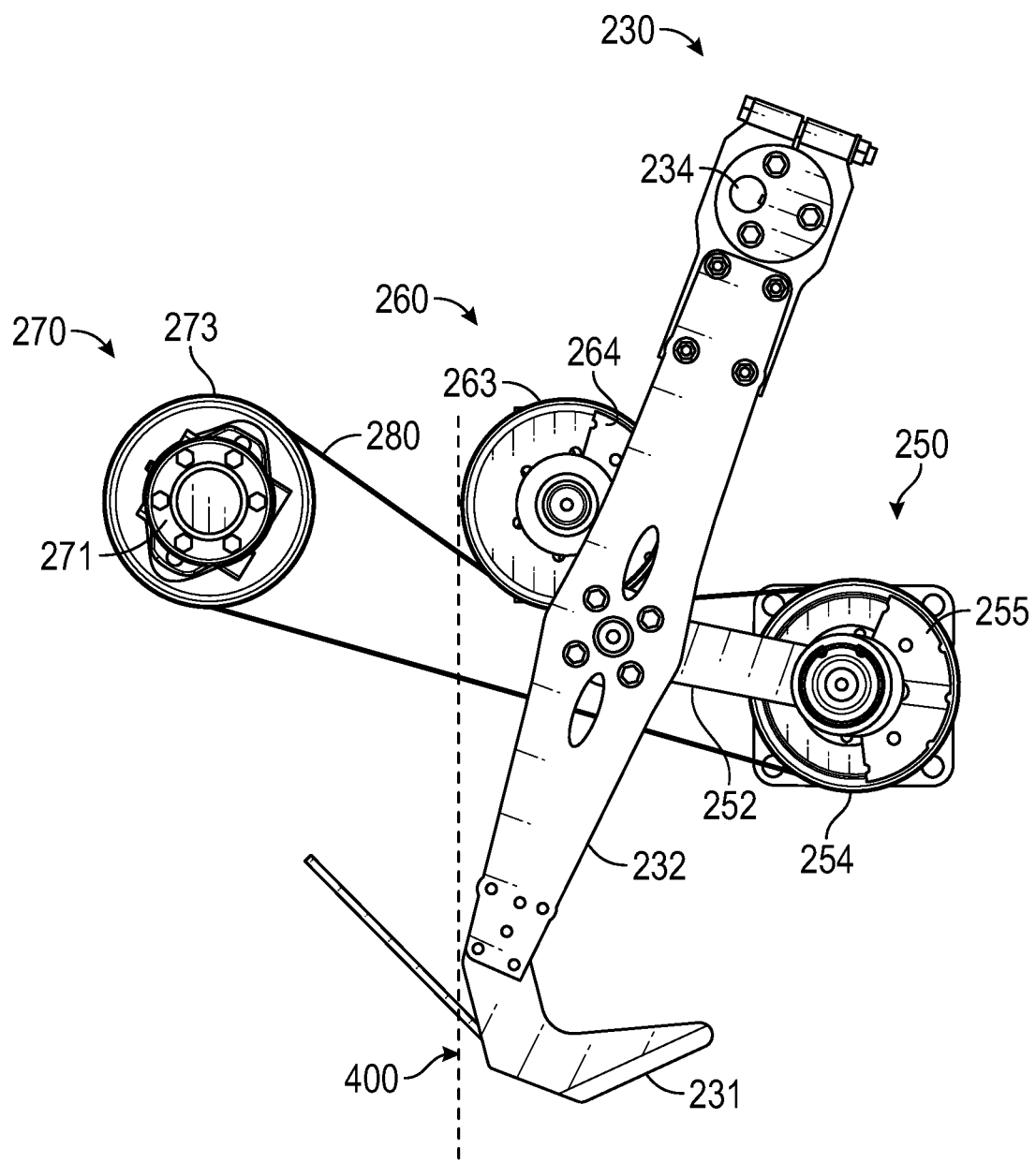

FIGS. 4A-4E illustrate how cutting blade assembly 230 is driven, and how crankshaft assembly 250 and countershaft assembly 260 are configured to counterbalance cutting blade assembly 230. In these figures, dashed line 400 represents a rearmost position of cutting blade 231. Accordingly, the sequence shown in FIGS. 4A-4E represents that cutting blade 231 is initially in a rearward position (FIG. 4A), then oscillates into a frontward position (FIG. 4C) and finally returns to the rearward position (FIG. 4E).

When motor 271 drives wheel 273, driving loop 280 will in turn drive wheel 254 and crankshaft 251. Due to the coupling between crankshaft 251 and connecting rods 252, as crankshaft 251 rotates, the rear ends of connecting rods 252 will oscillate back and forth causing cutting blade arms 232 to pivot around upper shaft 234. This pivoting causes cutting blade 231 to also oscillate back and forth between the rearward and frontward positions. These oscillations will be at a high rate to ensure that cutting blade 231 cleanly severs the sod from the ground.

During operation of cutting head 200, and because of the substantial mass of cutting blade assembly 230 and the high rate of oscillations, a significant amount of force in the form of vibrations will be applied to cutting head frame 210 and distributed to the various assemblies and the other components of the sod harvester. Given that cutting blade 231 oscillates along a horizontal plane, these forces will primarily be in the horizontal plane.

To account for the vibration forces that cutting blade assembly 230 creates, crankshaft assembly 250 can incorporate counterweights 255 that are coupled to crankshaft 251 so that each offset portion 302 will be on the frontward side of crankshaft 251's axis of rotation when cutting blade 231 is in the rearward position and on the rearward side of crankshaft 251's axis of rotation when cutting blade 231 is in the frontward position.

For example, in FIGS. 4A and 4E, cutting blade 231 is in the rearward position and counterweights 255 are in the frontward position. In contrast, in FIG. 4C, cutting blade 231 is in the frontward position and counterweights 255 are in the rearward position. In this way, counterweights 255 can balance the vibration forces that cutting blade assembly 230 creates primarily in the horizontal plane.

Although counterweights 255 can offset the vibration forces in the horizontal plane, they also introduce additional vibration forces in the vertical plane. For example, in FIGS. 4B and 4D, counterweights 255 are positioned above and below crankshaft 251's axis of rotation. As counterweights 255 rotate between these two positions, vertical vibration forces will be created and transferred to cutting head frame 210, the various assemblies and other components of the sod harvester. Countershaft assembly 260 can be configured to balance the vertical vibration forces that crankshaft assembly 250 creates. Additionally, both crankshaft assembly 250 and countershaft assembly 260 can be configured to balance the horizontal vibration forces that cutting blade assembly 230 creates.

As mentioned above, countershaft assembly 260 can be arranged so that wheel 263 rotates in a direction opposite that of wheel 254. Additionally, counterweights 264 can be coupled to countershaft 261 so that each offset portion 302 of the counterweights will be on the frontward side of countershaft 261's axis of rotation when cutting blade 231 is in the rearward position and on the rearward side of countershaft 261's axis of rotation when cutting blade 231 is in the frontward position. In other words, counterweights 255 and 264 can be arranged so that all of the offset portions 302 are in the rearward position at the same time (as shown in FIG. 4C) and in the frontward position at the same time (as shown in FIGS. 4A and 4E). In this way, counterweights 255 and 264 can balance the horizontal vibration forces that cutting blade assembly 230 creates.

In contrast, because wheel 263 rotates in a direction opposite that of wheel 254, the offset portions 302 of counterweights 264 will be in the downward position when the offset portions 302 of counterweights 255 are in the upward position (as shown in FIG. 4B) while the offset portions 302 of counterweights 264 will be in the upward position when the offset portions 302 of counterweights 255 are in the downward position (as shown in FIG. 4D). In this way, counterweights 264 can balance the vertical vibration forces that counterweights 255 create.

To summarize, both crankshaft assembly 250 and countershaft assembly 260 include counterweights 255/264 that are arranged to balance vibration forces that are created when cutting blade assembly 230 oscillates. Counterweights 264 in countershaft assembly 260 are also arranged to balance vibration forces that are created when counterweights 255 in crankshaft assembly 250 are rotated.

By balancing the horizontal vibration forces that cutting blade assembly 230 creates and the vertical vibration forces that crankshaft assembly 250 creates, the present invention can prolong the life of the various assemblies and other components of a sod harvester. For example, if the vibration forces are not adequately balanced, components such as actuator 245 may fail relatively quickly. The vibration forces may also be transferred to the cab where they may fatigue the operator.

In some embodiments, counterweights 255 and 264 may be substantially identical (e.g., the same shape, the same weight, the same center of mass, etc.). In such cases, the number of counterweights 264 may match the number of counterweights 255. This number may be two as shown in the figures or any other suitable number of counterweights. Preferably, the number of counterweights 255/264 will be even (e.g., 2, 4, 6, etc.) with an equal number of counterweights (e.g., 1, 2, 3, etc.) being positioned on opposing sides of the respective wheel 254/263.

In other embodiments, however, counterweights 255 and 264 may have a different shape, weight, center of mass, etc. In such cases, the number of counterweights 264 may not match the number of counterweights 255. For example, the two counterweights 264 depicted in the figures could be replaced with a single counterweight 264 that has a larger weight and/or a different center of mass relative to counterweights 255.

As mentioned above, in some embodiments, countershaft assembly 260 could be positioned in vertical alignment with crankshaft assembly 250. This vertical alignment would minimize any rocking motion that is induced by the rotation of counterweights 255 and 264. However, countershaft assembly 260 can be arranged in any suitable location relative to crankshaft assembly 250 as long as counterweights 264 can be caused to rotate in a direction opposite that of counterweights 255.

In the depicted design, although countershaft assembly 260 is rearwardly offset relative to crankshaft assembly 250, the impact of any rocking motion that is induced due to the offset can be minimized using the techniques of the '779 Patent. In particular, cutting head frame 210 can be coupled to the boom of the sod harvester using the support bars and lower yoke described in the '779 Patent which would allow cutting head frame 210 to rock without transferring the rocking force to the boom or other components of the sod harvester.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A cutting head for a sod harvester comprising:
a cutting blade assembly that includes a cutting blade that is configured to oscillate between a frontward position and a rearward position;
a crankshaft assembly that includes a crankshaft and one or more crankshaft counterweights that are configured to rotate around a crankshaft axis of rotation; and
a countershaft assembly that includes a countershaft and one or more countershaft counterweights that are configured to rotate around a countershaft axis of rotation;
wherein, when the cutting blade is in the rearward position, the one or more crankshaft counterweights and the one or more countershaft counterweights are configured to be positioned frontward of the crankshaft axis of rotation and countershaft axis of rotation respectively, and when the cutting blade is in the frontward position, the one or more crankshaft counterweights and the one or more countershaft counterweights are configured to be positioned rearward of the crankshaft axis of rotation and countershaft axis of rotation respectively;

wherein, when the one or more crankshaft counterweights are positioned above the crankshaft axis of rotation, the one or more countershaft counterweights are configured to be positioned below the countershaft axis of rotation, and when the one or more crankshaft counterweights are positioned below the crankshaft axis of rotation, the one or more countershaft counterweights are configured to be positioned above the countershaft axis of rotation.

2. The cutting head of claim 1, wherein the one or more crankshaft counterweights rotate around the crankshaft axis of rotation in a first direction and the one or more countershaft counterweights rotate around the countershaft axis of rotation in a second direction.

3. The cutting head of claim 2, wherein the second direction is opposite the first direction.

4. The cutting head of claim 1, wherein the one or more crankshaft counterweights comprise two crankshaft counterweights and the one or more countershaft counterweights comprise two countershaft counterweights.

5. The cutting head of claim 4, wherein the crankshaft assembly includes a crankshaft wheel and the two crankshaft counterweights are positioned on opposite sides of the crankshaft wheel, and wherein the countershaft assembly includes a countershaft wheel and the two countershaft counterweights are positioned on opposite sides of the countershaft wheel.

6. The cutting head of claim 1, wherein the countershaft axis of rotation is offset frontwardly or rearwardly relative to the crankshaft axis of rotation.

7. The cutting head of claim 1, wherein the countershaft axis of rotation is vertically aligned with the crankshaft axis of rotation.

8. The cutting head of claim 1, further comprising:
a cutting head frame, the cutting blade assembly being supported from the cutting head frame.

9. The cutting head of claim 1, wherein the cutting blade assembly includes opposing cutting blade arms, and the crankshaft assembly is coupled to and drives the opposing cutting blade arms to thereby cause the cutting blade to oscillate.

10. The cutting head of claim 1, wherein the crankshaft assembly includes a crankshaft wheel and the countershaft assembly includes a countershaft wheel, the cutting head further comprising:
a motor assembly that includes a motor wheel; and
a driving loop;
wherein the motor wheel causes the driving loop to rotate the crankshaft wheel in a first direction and the countershaft wheel in a second direction opposite the first direction.

11. The cutting head of claim 10, wherein the motor wheel, crankshaft wheel and countershaft wheel are sprockets and the driving loop is a chain.

12. A sod harvester comprising:
a cutting head, the cutting head comprising:
a cutting blade assembly that includes a cutting blade that is configured to oscillate to sever sod from the ground as the sod harvester travels over the ground;
a crankshaft assembly that includes one or more crankshaft counterweights that are configured to rotate to balance horizontal forces created by the oscillation of the cutting blade; and
a countershaft assembly that includes one or more countershaft counterweights that are configured to rotate to balance vertical forces created by the rotation of the one or more crankshaft counterweights.

13. The sod harvester of claim 12, wherein the one or more countershaft counterweights are also configured to rotate to balance the horizontal forces created by the oscillation of the cutting blade.

14. The sod harvester of claim 13, wherein the cutting blade oscillates between a frontward position and a rearward position, the one or more crankshaft counterweights rotate around a crankshaft axis of rotation, and the one or more countershaft counterweights rotate around a countershaft axis of rotation;

wherein, when the cutting blade is in the rearward position, the one or more crankshaft counterweights and the one or more countershaft counterweights are configured to be positioned frontward of the crankshaft axis of rotation and countershaft axis of rotation respectively, and when the cutting blade is in the frontward position, the one or more crankshaft counterweights and the one or more countershaft counterweights are configured to be positioned rearward of the crankshaft axis of rotation and countershaft axis of rotation respectively.

15. The sod harvester of claim 14, wherein, when the one or more crankshaft counterweights are positioned above the crankshaft axis of rotation, the one or more countershaft counterweights are configured to be positioned below the countershaft axis of rotation, and when the one or more crankshaft counterweights are positioned below the crankshaft axis of rotation, the one or more countershaft counterweights are configured to be positioned above the countershaft axis of rotation.

16. The sod harvester of claim 15, wherein the one or more crankshaft counterweights rotate around the crankshaft axis of rotation in a first direction and the one or more countershaft counterweights rotate around the countershaft axis of rotation in a second direction opposite the first direction.

17. The sod harvester of claim 16, wherein the one or more crankshaft counterweights comprise two crankshaft counterweights and the one or more countershaft counterweights comprise two countershaft counterweights.

18. A cutting head for a sod harvester comprising:
a cutting blade assembly that includes a cutting blade;
a crankshaft assembly that includes a crankshaft and one or more crankshaft counterweights that are configured to rotate around a crankshaft axis of rotation, the crankshaft assembly being coupled to the cutting blade assembly and being configured to cause the cutting blade to oscillate, wherein the rotation of the one or more crankshaft counterweights balances horizontal forces created by the oscillation of the cutting blade; and
a countershaft assembly that includes one or more countershaft counterweights that are configured to rotate to balance the horizontal forces created by the oscillation of the cutting blade and to balance vertical forces created by the rotation of the one or more crankshaft counterweights.

19. The cutting head of claim 18, wherein the cutting blade oscillates between a frontward position and a rearward position, the one or more crankshaft counterweights rotate around a crankshaft axis of rotation, and the one or more countershaft counterweights rotate around a countershaft axis of rotation;

wherein, when the cutting blade is in the rearward position, the one or more crankshaft counterweights and the one or more countershaft counterweights are configured to be positioned frontward of the crankshaft axis of rotation and countershaft axis of rotation respectively, and when the cutting blade is in the frontward position, the one or more crankshaft counterweights and the one or more countershaft counterweights are configured to be positioned rearward of the crankshaft axis of rotation and countershaft axis of rotation respectively.

20. The cutting head of claim 18, wherein, when the one or more crankshaft counterweights are positioned above the crankshaft axis of rotation, the one or more countershaft counterweights are configured to be positioned below the countershaft axis of rotation, and when the one or more crankshaft counterweights are positioned below the crankshaft axis of rotation, the one or more countershaft counterweights are configured to be positioned above the countershaft axis of rotation.

* * * * *